No. 792,470. PATENTED JUNE 13, 1905.
S. T. SIMMONS & W. T. MOORE.
SANDER.
APPLICATION FILED JAN. 5, 1905.
2 SHEETS—SHEET 2.
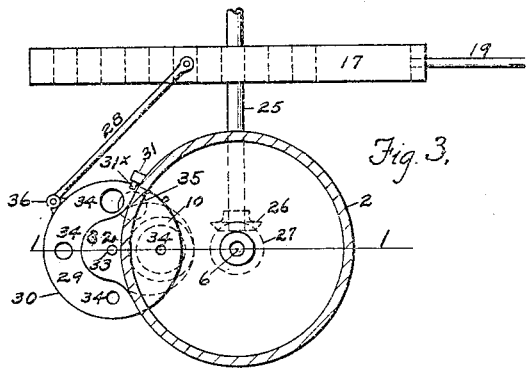
Fig. 3.
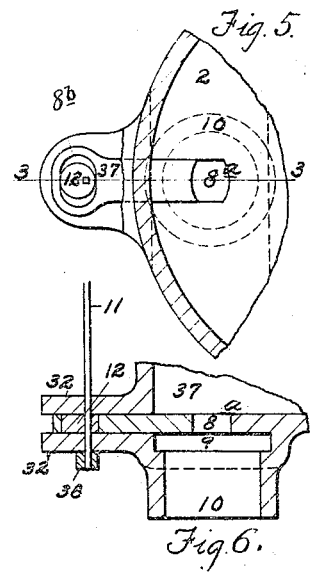
Fig. 5.
Fig. 6.
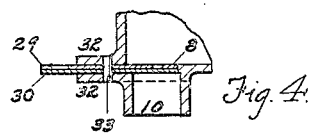
Fig. 4.
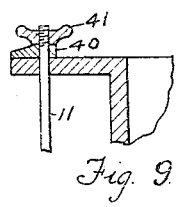
Fig. 9.
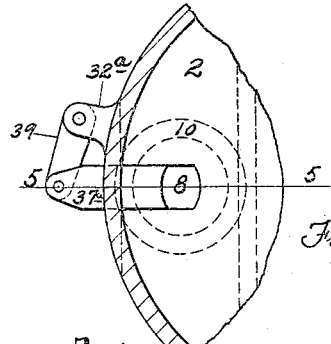
Fig. 7.
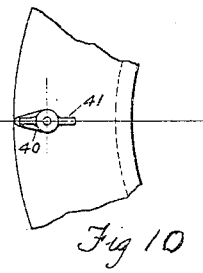
Fig. 10.
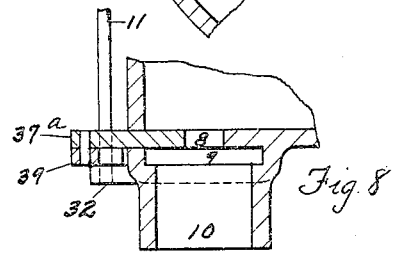
Fig. 8.
WITNESSES.
Lulu Lindemann,
E. E. Moore
INVENTORS.
Samuel T. Simmons
Walter T. Moore No. 792,470.  
Patented June 13, 1905.

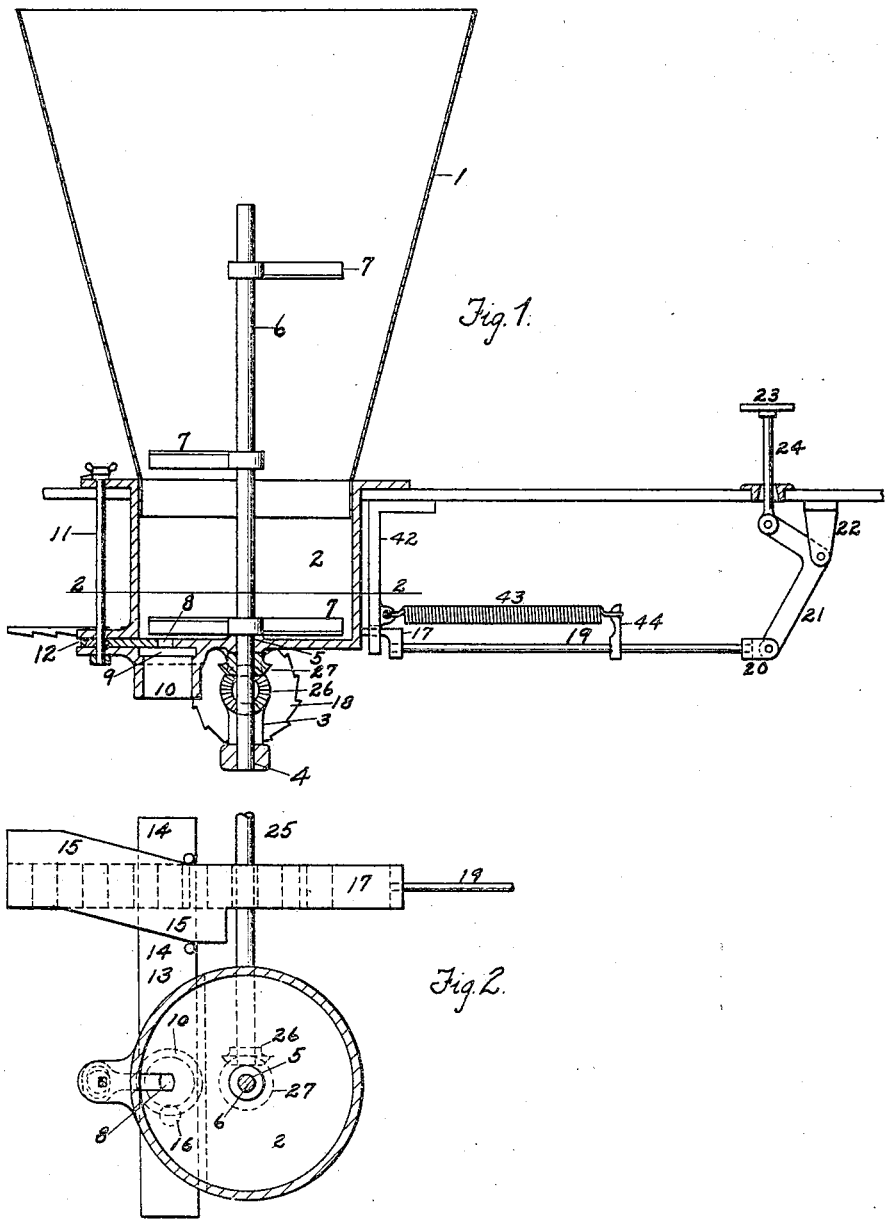

UNITED STATES PATENT OFFICE.

SAMUEL T. SIMMONS AND WALTER T. MOORE, OF COLUMBUS, OHIO.

SANDER.

SPECIFICATION forming part of Letters Patent No. 792,470, dated June 13, 1905.

Application filed January 5, 1905. Serial No. 239,781.

*To all whom it may concern:*

Be it known that we, SAMUEL T. SIMMONS and WALTER T. MOORE, citizens of the United States, residing at Columbus, in the county of Franklin and State of Ohio, have invented new and useful Improvements in Sanders, of which the following is a specification.

Our invention relates to sanders; and the object of the same is to construct a device for distributing uniformly wet, dry, or crusted sand or other granulated substances on the rails beneath the car.

The simple and novel construction employed by us in carrying out our invention is fully described in this specification and claimed, and illustrated in the accompanying drawings, forming a part thereof.

In the accompanying drawings, illustrating the preferred embodiment of our invention, Figure 1 is a sectional elevation thereof. Fig. 2 is a horizontal section produced upon the line 2 2 of Fig. 1. Fig. 3 is a view in horizontal section of a modified form of our invention, embracing what we term a "combined disk regulator and cut-off." Fig. 4 is a broken vertical section produced upon the line 1 1 of Fig. 3. Fig. 5 is a broken horizontal section of a further modification, showing what we style an "eccentric-regulator" employed in connection with the slide-valve cut-off. Fig. 6 is a broken vertical section taken upon the line 3 3 of Fig. 5. Fig. 7 is a broken horizontal section of a third modification, showing what may be called a "lever-regulator" used in connection with the slide-valve cut-off. Fig. 8 is a broken vertical section produced upon the line 5 5 of Fig. 7. Fig. 9 is a fragmentary sectional view showing more especially the indicator and locking contrivance for the sander-regulator, taken upon the line indicated in Fig. 10. Fig. 10 is a broken plan view of the parts shown in Fig. 9.

Like numerals of reference designate like parts in the different views of the drawings.

The numeral 1 designates a hopper of suitable size and construction. The numeral 2 refers to a cylindric casing or chamber therebelow, integral with which is a pendant 3, terminating at its lower end in a bearing 4. In the bottom of casing 2 is also a bearing 5 in vertical alinement with the bearing 4. Journaled in these bearings is a vertical shaft 6, extending through the casing 2 and a suitable distance into the hopper or receptacle 1 and bearing a plurality of blades or agitators 7, the purpose of which is obvious. An aperture 8 in the bottom chamber or casing 2, forming a continuation of said hopper, and through which aperture is discharged the sand or contents of the latter, receives a regulator of any one of the forms as disclosed by Figs. 1, 2, 3, 4, 5, and 6, and hereinafter described.

Arranged to slide in opposite guides or grooves 9, produced in the lateral walls of the nozzle 10, depending from the bottom of the chamber 2, is a slide, valve, or cut-off 13, disposed directly over and controlling the intake end of said nozzle, and to the latter may be applied a suitable tube or conductor (not shown) for the delivery or conduct of the sand or other substance of the hopper to the railway-track rails.

A rack 17, suitably supported in position laterally of the chamber 2, has itself lateral parallel inclined or diagonal surfaces or edges 15, adapted to move between and to engage upstanding opposite studs or pins 14 of the slide 13 for the actuation of the latter, said slide thus being adapted to be moved in a direction at right angles to the movement of said rack. Said slide has an opening 16, adapted to be brought into registration with the nozzle 10 when the first-named slide is actuated for the suitable delivery or discharge of the sand or contents of the hopper 1 or chamber 2 into said nozzle. Said rack 17 has engagement with a ratchet-pinion 18, secured upon a shaft 25, suitably journaled in position, one end of said shaft being miter-geared, as at 26 and 27, to the agitator-shaft 6, itself journaled at 4 and 5 at the lower end of the bearing 3, and in the bottom of the chamber 2, respectively, as seen in Fig. 1, said arrangement providing for the actuation of the agitator 6 and 7 through said rack 17. To one end of said rack is fixed a rod 19, having connected to it by a clevis 20 a bell-crank 21, suitably hung from a bracket or hanger 22, secured to the under side of the car floor or frame, the upper end of said bell-crank having connected thereto a push bar or rod 23 24 for the convenient manual actuation thereof, in turn operating said rack.

For effecting the automatic return of the rack 17 and with it the slide 13 to their initial positions a spring 43, preferably of the helical or other preferred form, is employed, having one end connected to the hopper continuation 2 or bracket 42 and its other end connected to an arm or bracket 44, secured to the rod 9.

In Figs. 3 and 4, wherein is disclosed more particularly a disk regulator and cut-off, 29 and 30 designate upper and lower disks thereof. The upper disk 29 has a plurality of graduated apertures 34 and is suitably held in place by a spring 31$^\times$ bearing thereon and secured to a lug 31, integral with the part 2. The lower disk 30, having an aperture 35, acts as a cut-off, and between said disk and rack 17 connection is effected by means of a bar or lever 28 for actuating said disk. Said disks 29 30 are held between lugs 32, integral with the part 2, by a fixed pivot-pin 33, passed through said lugs and disks and forming an axis or pivot for the disks 29 30.

In the form of what we term an "eccentric-regulator," as disclosed by Figs. 5 and 6, are provided an eccentric 12 and a slide or plunger 37, the latter being arranged in an aperture or slot 8$^a$ in the bottom of the part 2 and the former arranged in an oblong slot 8$^b$ in said slide and secured to and adapted to be adjusted by a rod or shaft 11, extending upward through an extension or flange of the part or casing 2, where it is provided with a thumb or winged nut 41, bearing upon an indicator 40, resting upon said flange or extension, and through which passes said rod or shaft and by means of which said shaft or rod, together with said eccentric 12, may be locked in position.

In Figs. 7 and 8 is shown a regulator composed of an arm or lever 39 and a slide 37$^a$, similarly arranged as the corresponding part in Figs. 3 and 4 and having said arm or lever connected thereto and between lugs 32$^a$ integral with the part 2. Said arm, with said slide, is adapted to be similarly adjusted and retained in locked position as the parts of Figs. 3 and 4.

In operation the hopper or receptacle, with its lower end continuation as represented by the part 2, is presumably supplied with sand or other substance. It being desired to "sand" the track or rails, the push-bar 24 is pressed downward manually, actuating, through the rack 17, the shaft 25, in turn actuating the agitator 6 7 by means of the gearing 26 27, thus loosening or agitating the contents of said hopper, &c. The movement of the rack 17 also has the effect to cause its inclined or diagonal surfaces to move the slide 13, so as to effect the registration of the apertures 16 and 8, whereby the loosened sand or contents of said hopper will be discharged therefrom through the nozzle 10 and attached tube upon the track. The parts, except the agitator, when pressure or force has been removed from said push-bar will automatically resume their normal or initial position under the recoil action of the spring 43.

It will be here noted that the parts may be readily duplicated for opposite sides of the car for simultaneously sanding both rails or either rail of the track and yet the duplicate contrivances or mechanism thus provided be manipulated from a common means.

In the disk regulator or cut-off as disclosed by Figs. 3 and 4 the movement of the rack 17 by the aid of the arm or lever 28 actuates the disk 30, so as to effect the like registration as in the equivalent parts as above noted between apertures 34 and 35 of the disks 29 and 30, respectively, permitting the flow or delivering of the contents of the parts 1 2 to the rails. Desiring to increase or decrease the quantity of sand to be delivered, the spring 31$^\times$, bearing upon the disk 29, is loosened, permitting the requisite adjusting or turning of the disk 29 according to the opening it may be required to bring into registration as conditions suggest, said parts of course being again tightened in place. By the requisite adjustment of the eccentric 12, as in Fig. 5, acting upon the slide by suitably turning the shaft or staff 11 the delivering or discharging capacity of the apparatus 8 may be varied, as conditions may require, for securing the same results as in the aforesaid adjustment of parts. So by the like movement of the parts 37 and 39, as in Fig. 7, the same end may be effected as noted in either of the above-described adjustment of parts.

It is understood that we are not limited as to details of construction, since they may be modified in many ways without departing from the spirit of our invention.

We claim—

1. In a device of the character described, the combination of a sand-box, adapted to deliver its contents to the rail of a railway-track, of a regulator and cut-off valve, substantially as described.

2. In a device of the character described, the combination of a sand-box, adapted to deliver its contents to the rails of a railway-track, of an eccentric-controlled regulator used in connection with a slide-valve, substantially as described.

3. A device of the character described, employing a dropping or delivering slide and means adapted to be manually actuated and to effect the movement of said slide in a direction at right angles to itself.

4. A device of the character described, employing a dropping or delivering slide, and a rack adapted to be manually actuated and having lateral inclined planes for effecting the movement of said slide in a direction at right angles to the movement of said rack.

5. A device of the character described, employing a delivering-slide, an agitator arranged in a sand or other receptacle, a rack adapted to be manually actuated and having lateral inclined planes for effecting the movement of said slide, and means effective with said rack to actuate said agitator.

6. A device of the character described, employing a delivering-slide, an agitator arranged in a sand or other receptacle, a rack adapted to be manually operated and having lateral inclined planes for effecting the movement of said slide, and a shaft and gearing effective with said rack to actuate said agitator simultaneously with said slide.

7. A device of the character described, employing an agitator arranged in a sand or other receptacle, a shaft geared to said agitator and having a ratchet-pinion, a sand-delivering slide for said receptacle, a rack adapted to engage said ratchet-pinion and actuate said slide, and means for actuating said rack.

8. A device of the character described, employing an agitator arranged in a sand or other receptacle, a shaft geared to said agitator, a rack geared to said shaft, means for actuating said rack, and a delivering or discharging slide arranged in connection with said receptacle, said rack having lateral inclined planes adapted to effect the actuation of said slide simultaneously with the movement of said agitator and in a plane at right angles thereto.

9. A device of the character described, employing a sand or other receptacle, a dropping or discharging slide arranged in connection with the latter, means for adjusting or controlling the discharging capacity of said receptacle, arranged with relation to said slide, means for actuating said slide, and means effective with said slide-actuating means, for operating said agitator.

10. A device of the character described, employing a sand-containing or other receptacle, a slide for discharging the contents of said receptacle, means for actuating said slide, an additional slide arranged in the discharging-opening of said receptacle in connection with the aforesaid slide, an eccentric arranged within an oblong slot in the latter slide, and means for actuating said eccentric, for effecting the adjustment of said latter slide.

11. A device of the character described, employing a sand-containing or other receptacle, an agitator arranged therein, a dropping or discharging slide for said receptacle, a rack, means for actuating said rack, means effective with said rack for operating said agitator, means effective with said rack to actuate said slide, and means for automatically returning said rack, together with said slide and agitator, to initial position.

12. A device of the character described, employing a sand-containing or other receptacle, means for agitating the contents of said receptacle, means for operating said agitating means, a discharging-slide for said receptacle, a rack geared with said operating means and adapted to actuate said slide, means for actuating said rack, and a spring adapted to deliver its pressure or force to said rack-actuating means, for effecting the automatic return of said rack to its initial position.

In testimony whereof we affix our signatures in presence of two subscribing witnesses.

SAMUEL T. SIMMONS.
WALTER T. MOORE.

Witnesses:
LULU LINDEMANN,
E. E. MOORE.